United States Patent
Yoon et al.

(10) Patent No.: US 6,664,486 B2
(45) Date of Patent: Dec. 16, 2003

(54) STEP KEYS, STEP KEY ASSEMBLY, AND TERMINAL HAVING THE STEP KEY ASSEMBLY

(75) Inventors: Gee-Hong Yoon, Songnam-shi (KR); Young-Keun Lee, Seoul (KR); Young-Bae Ji, Yongin-shi (KR); Young-In Cho, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/209,100

(22) Filed: Jul. 31, 2002

(65) Prior Publication Data

US 2002/0185360 A1 Dec. 12, 2002

Related U.S. Application Data

(62) Division of application No. 09/855,880, filed on May 15, 2001, now Pat. No. 6,495,784.

(30) Foreign Application Priority Data

May 16, 2000 (KR) .......................................... 25975/2000
Sep. 22, 2000 (KR) .......................................... 55680/2000

(51) Int. Cl.[7] ................................................ H01H 9/26
(52) U.S. Cl. ........................................ 200/5 A; 200/512
(58) Field of Search ................................. 200/517, 343, 200/5 A, 512, 513; 400/476–496

(56) References Cited

U.S. PATENT DOCUMENTS

| | | | | |
|---|---|---|---|---|
| 4,066,850 A | * | 1/1978 | Heys, Jr. ..................... | 200/5 A |
| 4,096,364 A | | 6/1978 | Lynn et al. | |
| 4,430,531 A | | 2/1984 | Wright | |
| 4,532,575 A | * | 7/1985 | Suwa ......................... | 361/680 |
| 4,987,277 A | | 1/1991 | Duhon | |
| 5,387,042 A | | 2/1995 | Brown | |
| 5,912,443 A | * | 6/1999 | Hasunuma ................... | 200/5 A |
| 6,023,033 A | * | 2/2000 | Yagi et al. .................. | 200/512 |
| 6,140,596 A | * | 10/2000 | Tsay .......................... | 200/406 |
| 6,180,896 B1 | * | 1/2001 | Naritomi .................... | 200/5 A |
| 6,278,072 B1 | * | 8/2001 | Nakajo ....................... | 200/341 |
| 6,444,928 B2 | * | 9/2002 | Okamoto et al. ........... | 200/5 A |
| 6,455,796 B2 | * | 9/2002 | Kashino ..................... | 200/512 |

* cited by examiner

Primary Examiner—Elvin Enad
Assistant Examiner—Lisa Klaus
(74) Attorney, Agent, or Firm—Dilworth & Barrese, LLP

(57) ABSTRACT

Step keys, a step key assembly, and a terminal having the step key assembly are disclosed. An individual step key includes a first slope portion inclined at a first predetermined angle, a second slope portion inclined at a second predetermined angle in the opposite direction to the first slope portion, a recess having a first height and opened under the first slope portion in the forward direction of the step key, a protrusion having a second height lower than the first height and extended from under the second slope portion in the rear direction of the step key, and an extension extended from under the first and second slope portions.

3 Claims, 27 Drawing Sheets

STEP KEYS, STEP KEY ASSEMBLY, AND TERMINAL HAVING THE STEP KEY ASSEMBLY

This application is a divisional of parent application Ser. No. 09/855,880, filed on May 15, 2001 now U.S. Pat. No. 6,495,784.

PRIORITY

This application claims priority to an application entitled "Step Keys, Step Key Assembly, and Terminal Having the Step Key Assembly" filed in the Korean Industrial Property Office on May 16, 2000 and assigned Serial No. 2000-25975, and to an application entitled "Step Keys, Step Key Assembly, and Terminal Having the Step Key Assembly" filed in the Korean Industrial Property Office on Sep. 22, 2000 and assigned Serial No. 2000-55680, the contents of which are hereby incorporated by reference.

BACKGROUND OF THE INVENTION

1. Field of the Invention

The present invention relates generally to a terminal, and in particular, to individual step keys that are pressed to enter data like characters or digits and a step key assembly having the individual step keys.

2. Description of the Related Art

Portable terminals are classified into a bar type, a flip type, and a folder type according to their outer appearances. The flip-type and folder-type ones are more commonplace because they are-feasible for miniaturization of main bodies and protection of keys. In the case of a flip-type terminal, its flip acts as a sound reflecting plate and a microphone can be installed on the flip. In the case of a folder-type terminal, its folder acts as a sound reflecting plate and protects a plurality of keys, and an auxiliary device such as an LCD (Liquid Crystal Display) can be installed on the folder. In the future, in terms of performance and design, the terminals will be developed further toward small size and lightweight design, and customers will carry smaller and lighter terminals as accessories.

The terminal is necessarily provided with a data input device and a data output device to input and output information. A keypad having a plurality of keys that are pressed for entry of data is most widely used as the data input device. Aside from the keypad, data is input by touching a touch screen or by voice using a speech recognition device.

It is, however, well known that the keypad (or key assembly) occupies a large area on a main body, impeding miniaturization of the terminal. On the other hand, scaling down of individual keys in the keypad will cause a user inconvenience in pressing them and increase pressing errors. Therefore, miniaturization of terminals is incompatible with convenient user key pressing in the conventional technology.

SUMMARY OF THE INVENTION

It is, therefore, an object of the present invention to provide step keys and a step key assembly having step keys that are easy to press and feasible for miniaturization of a main body.

It is another object of the present invention to provide a terminal having a step key assembly that contributes to miniaturization of its main body and maximization of key size in order to offer a smaller terminal and more convenient key pressing to a user.

It is a further object of the present invention to provide a terminal having a step key assembly that is readily assembled.

It is still another object of the present invention to provide a terminal that enables a user to input data more conveniently.

The foregoing and other objects are achieved by providing step keys, a step key assembly, and a terminal having the step key assembly. An individual step key includes a first slope portion inclined at a first predetermined angle, a second slope portion inclined at a second predetermined angle in the opposite direction to the first slope portion, a recess having a first height and opened under the first slope portion in the forward direction of the step key, a protrusion having a second height lower than the first height and extended from under the second slope portion in the rear direction of the step key, and an extension extended from under the first and second slope portions.

The key assembly includes a plurality of step keys and a film. Each includes a first slope portion inclined at a first predetermined angle, a second slope portion inclined at a second predetermined angle in the opposite direction to the first slope portion, a recess having a first height and formed under the first slope portion in the forward direction of the step key, a protrusion having a second height lower than the first height and extended from under the second slope portion in the rear direction of the step key, and an extension extended downward from the lower surface of the step key. The film has a plurality of holes at predetermined positions for holding the step keys and a protrusion in a predetermined position, for pressing down a metal dome when the step keys are pressed down. Therefore, the individual step keys are integrally arranged in contact with each other with the protrusions of the step keys inserted into the recesses of the respective adjacent step keys thereof on the film.

In the terminal, a main body has support frames integrally arranged in parallel in a transverse direction. A plurality of step keys are arranged in rows and columns, the rows of the step keys are separated from each other, and the top ends of the step keys are exposed between the support frames from the main body. A film has a plurality of holes at predetermined positions for holding the step keys and a protrusion at a predetermined position, for pressing down a metal dome when a step key is pressed down. Therefore, the step keys are integrally arranged with the protrusions of the steps keys inserted into the recesses of the respective adjacent step keys on the film.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

It is to be noted that step key assemblies according to the present invention are applicable to all terminals including bar-type, flip-type, and folder-type ones and including terminals focused on voice transmission and terminals that additionally provide transmission of pictures.

The following description will be made of step key assemblies applied to bar-type terminals by way of example.

Figure 1:
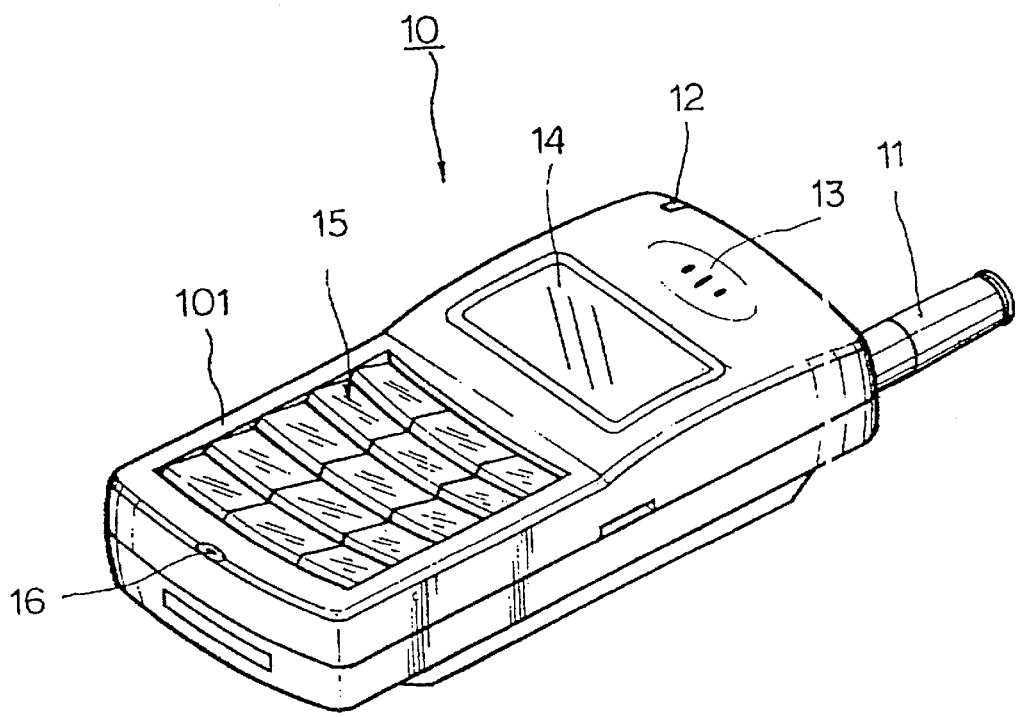
FIG. 1 is a perspective view of a terminal having a step key assembly according to an embodiment of the present invention.

FIG. 1 is a perspective view of a bar-type terminal having a step key assembly according to a first embodiment of the present invention. Referring to FIG. 1, a main body 10 has an antenna device 11 on an uppermost end, an incoming call lamp 12 on an upper end, an earpiece 13 including a speaker, a display 14 for displaying input data, a step key assembly 15 for entering data, and a microphone 16 at a lowermost end.

Only the top ends of step keys are exposed from the top side of the main body 10 to allow a user directly to press the step keys. The step keys are assembled into the step key assembly 15 and fixed to the main body 10.

Figure 2:
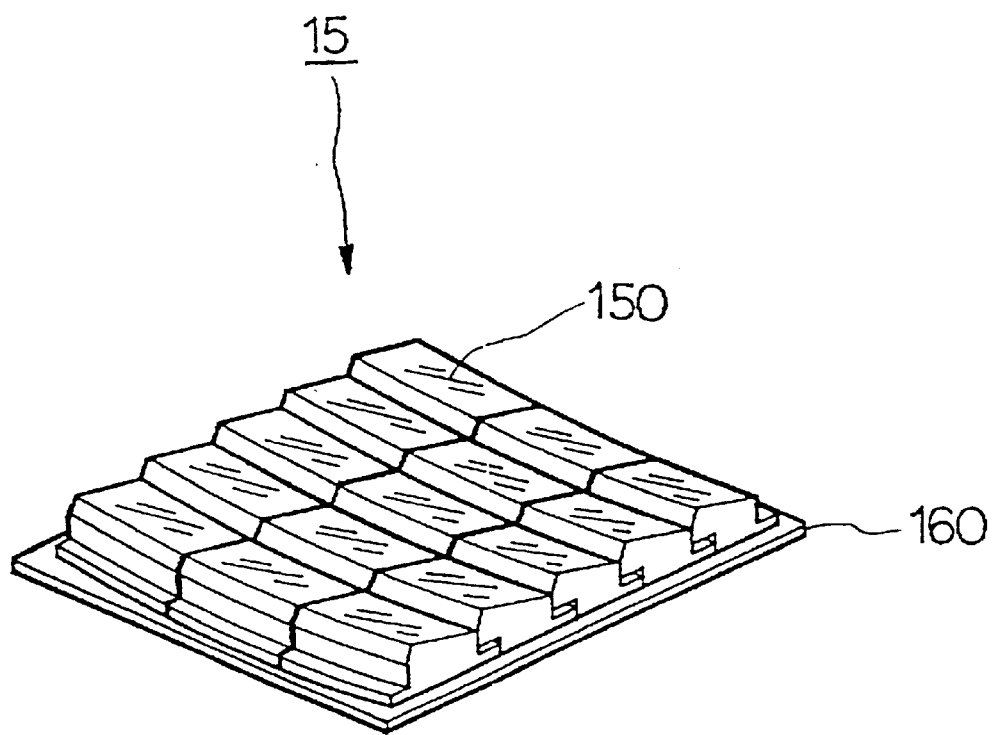
FIG. 2 is a perspective view of the step key assembly according to a first embodiment of the present invention.

FIG. 2 is a perspective view of the step key assembly 15 according to the first embodiment of the present invention. Referring to FIG. 2, individual step keys 150 of the step key assembly 15 are integrally arranged in rows and columns on a film 160. The keys 150 are stepwise assembled in contact with each other on the film 160.

Figure 3:
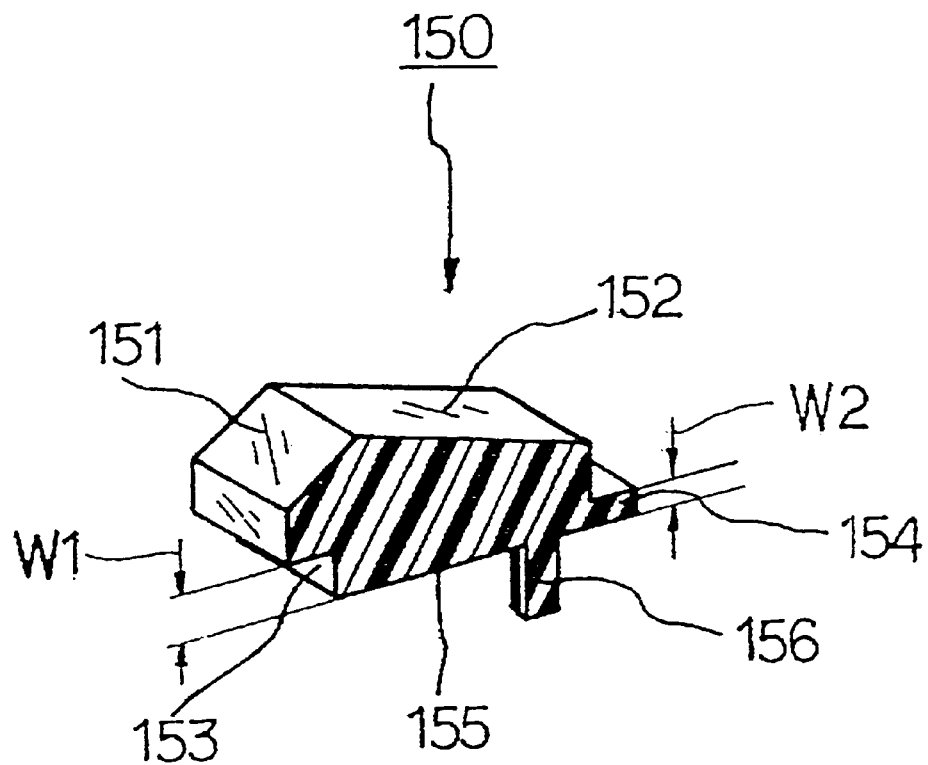
FIG. 3 is a sectional perspective view of an individual step key according to the first embodiment of the present invention.

The configuration of an individual step key 150 according to the present invention will be described with reference to FIG. 3. The individual step key 150 shown in FIG. 3 is in an injection-molded state before it is assembled on the film. The top end of the individual step key 150 is divided into a first slope portion 151 inclined at a first predetermined angle and a second slope portion 152 connected to the first slope portion 151 and inclined at a second predetermined angle in the opposite direction to the first slope portion 151. The first slope portion 151 is smaller in area that the second slope portion 152 and the first predetermined angle is greater than the second predetermined angle. A recess 153 is formed in the front part of the step key 150 and a protrusion 154 is extended from the rear end of the step key 150. An extension is extended downward for a predetermined length from the bottom end 155 of the individual step key 150. The recess 153 and the protrusion 154 are used to integrally fix a plurality of individual step keys 150 on the film. The extension 156 is preferably engaged into the film by an ultrasonic laser beam. At least one extension 156 is preferably formed on the bottom end 155 to more securely fix the individual step key 150 to the film. The height W1 of the recess 153 is greater than the height W2 of the protrusion 154 to provide a movement space for the individual step key 150 with respect to an adjacent step key when it is pressed down to enter data using the step key assembly.

Figure 4:
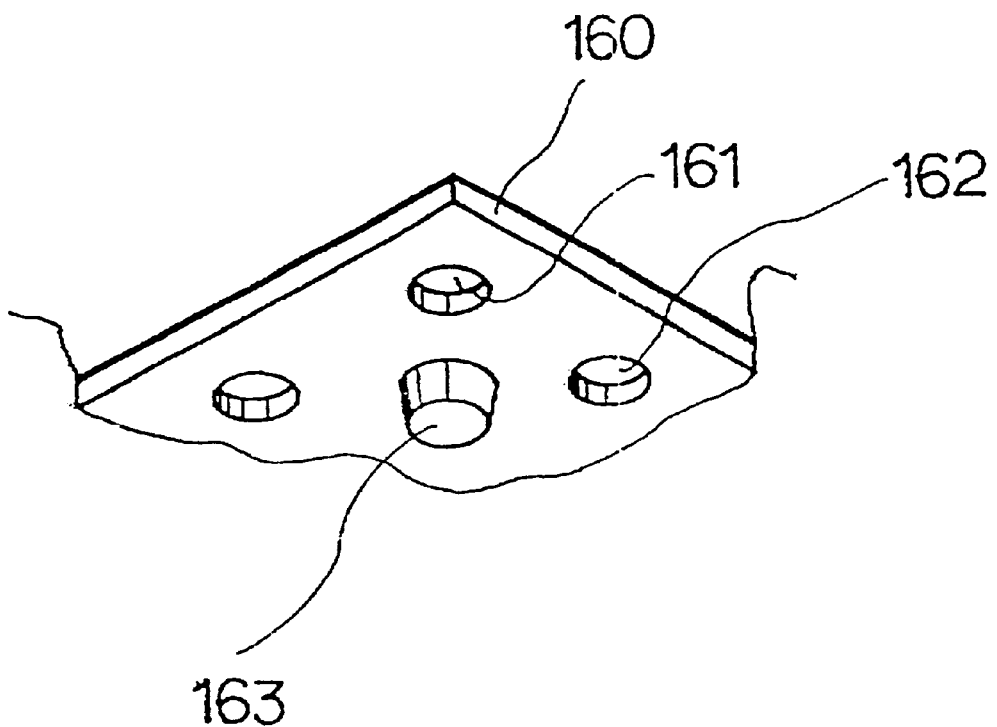
FIG. 4 is a perspective view illustrating a portion of a film on which step keys are fixed according to the first embodiment of the present invention.

FIG. 4 is a cut perspective view of the film onto which the plurality of individual step keys are fixed according to the first embodiment of the present invention. The film 160 includes circular holes 161 and 162 into which the extensions of the individual step keys are inserted and a protrusion 163 that presses a metal dome when a step key is pressed down. The number of holes 161 and 162 is identical to that of the extensions of the individual step keys.

Figure 5:
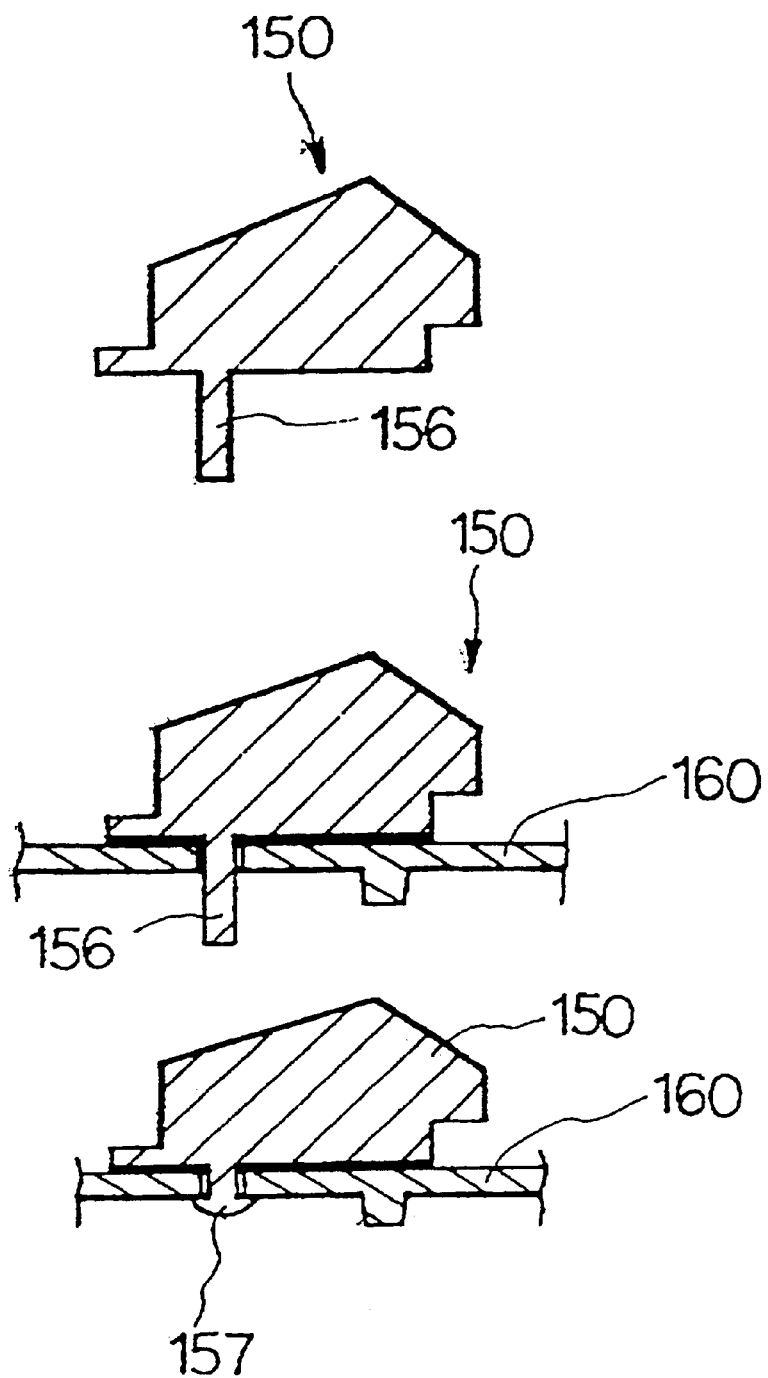
FIG. 5 illustrates a procedure of fixing an individual step key onto the film according to the first embodiment of the present invention.

FIG. 5 illustrates sections of the individual step key 150 utilized to describe a procedure of fixing the individual step key 150 on the film 160. Referring to FIG. 5, the extension 156 of the step key 150 that was individually injection-molded is inserted into a hole of the film 160. Then, the extension 156 is formed into a rivet 157 by ultrasonic laser beam processing, to thereby engage the individual step key 150 onto the film 160. In this manner, the plurality of individual step keys 150 are fixed on the film 160, forming the step key assembly 150 shown in FIG. 2.

Figure 6:
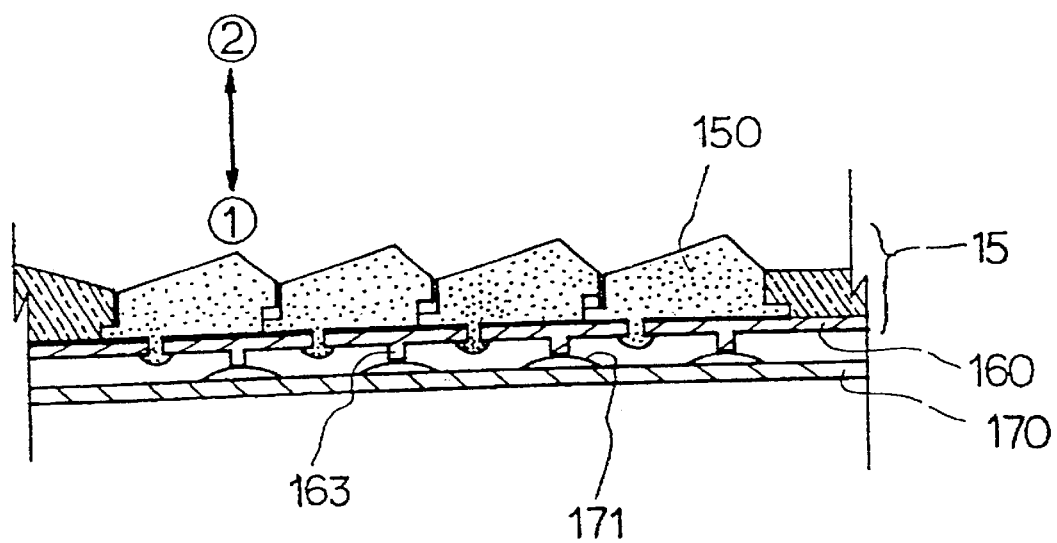
FIG. 6 is a sectional view of a data input device having the step key assembly according to the first embodiment of the present invention.

FIG. 6 is a sectional view of a data input device in the terminal having the step key assembly 15 according to the first embodiment of the present invention. Referring to FIG. 6, the data input device is comprised of the plurality of step keys 150, the film 160 on which the step keys 150 are fixed, protrusions 163 extended downward from the film 160, known metal domes 171 (including not-shown carbon contact points) that are pressed by the protrusions 163, and a PCB (Printed Circuit Board) 170 connected to the metal domes 171. When the user presses the step keys 150 in a direction 1 to enter data, the centers of the contacts, i.e. metal domes 171, contact the PCB 170 by the protrusions 163. The protrusions 163 return in a direction 2 by the elasticity of the metal domes 171.

Figure 7:
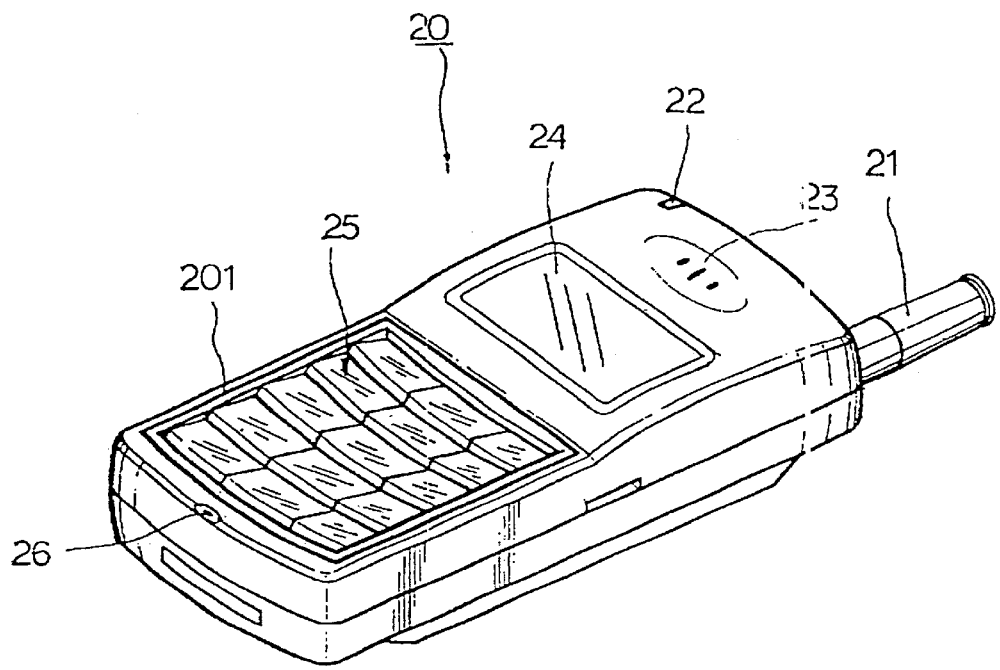
FIG. 7 is a perspective view of a terminal having a step key assembly according to another embodiment of the present invention.
Figure 8:
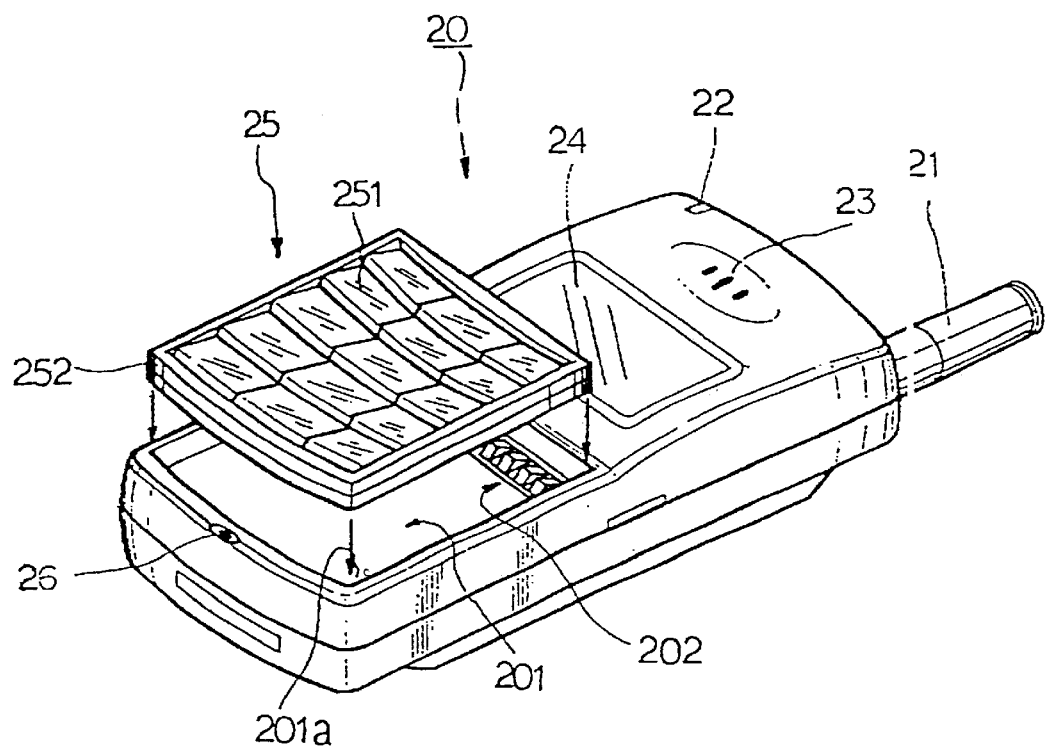
FIG. 8 is a perspective view of the terminal and the step key assembly that are separated from each other according to the second embodiment of the present invention.
Figure 9:
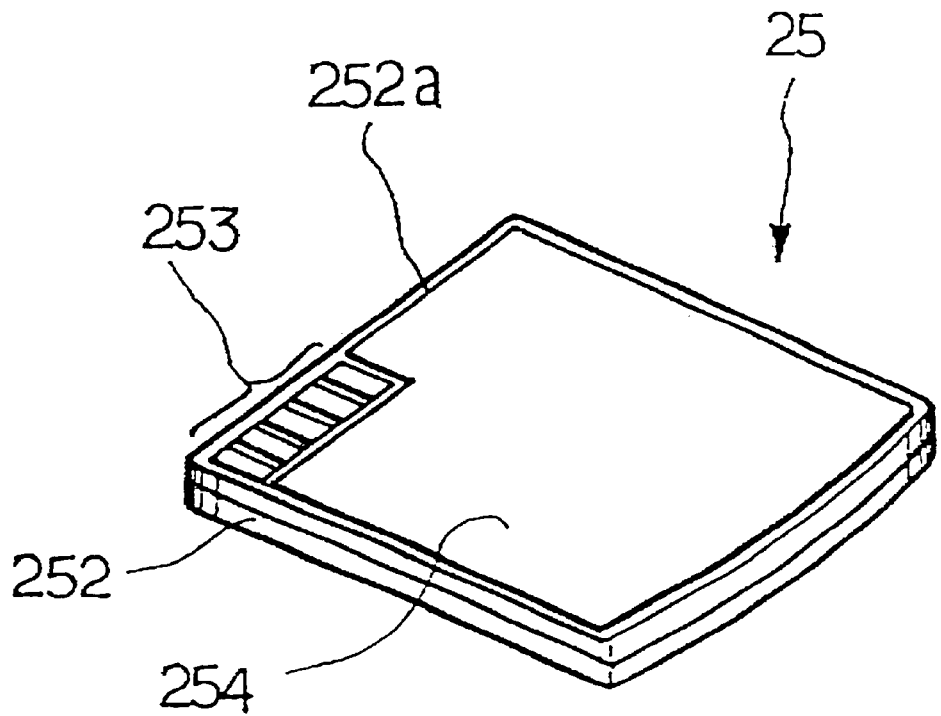
FIG. 9 is a perspective bottom view of the step key assembly according to the second embodiment of the present invention.

FIG. 7 is a perspective view of a terminal having a step key assembly 25 according to a second embodiment of the present invention, FIG. 8 is a perspective view of the terminal and the step key assembly 25 that are separated from each other, and FIG. 9 is a perspective bottom view of the step key assembly 25. Referring to FIGS. 7, 8, and 9, the terminal is comprised of a main body 20 having a recess 201 at a predetermined position, an antenna device 21 at an upper end of the main body 20, an earpiece 23 under the antenna device 21, a display 24 under the earpiece 23, the independent step key assembly 25 assembled in the recess 201 under the display 24, a double-sided tape 254 for fixing the step key assembly 25 in the recess 201, a connection portion including first and second terminals 202 and 253 for electrically connecting the step key assembly 25 to the main body 20, and a microphone 26 under the step key assembly 25. The step key assembly 25 is placed down and fixed in the recess 201. Here, the double-sided tape 254 is attached to the bottom surface 252a of the step key assembly 25 to fix the step key assembly 25 on the bottom surface 201a of the recess 201. The first and second terminals 202 and 253 are disposed at a first predetermined position on the recess bottom surface 201 and at a second predetermined position on the key assembly bottom surface 252a, respectively. When the step key assembly 25 is attached in the recess 201, the first and second terminals 202 and 253 are connected. As a result, the step key assembly 25 is electrically connected to a PCB (not shown) of the main body 20. Reference numeral 22 denotes an incoming call lamp.

While it is shown that the step key assembly 25 includes a casing frame 252 and step keys 251 which are arranged in rows and columns in contact with each other, it is to be noted that the step key assembly 25 further includes a film (not shown), which has been described above in detail. Though not shown, the film, metal domes, and the PCB or flexible printed circuit are disposed under the step keys 251. The second terminals 253 are connected to the PCB or the flexible printed circuit.

The location of the first terminals 202 is not limited to a corner of the recess bottom surface 201a. For example, the first terminals 202 may be located at the center or a sidewall of the recess 202. The location of the second terminals 253 is not limited to the corner of the bottom surface 252a of the casing frame 252 either. The second terminals 253 may also be located at the center of the bottom surface 252a or on a side of the casing frame 252.

A different means for electrically connecting the step key assembly 25 to the main body 20 can be used instead of the first and second terminals 202 and 253. For example, the first and second terminals 202 and 253 can be replaced with a pair of female/male connectors, particularly a pair of female/male connector using a flat-type cable, in consideration of assembly facility.

Figure 10:
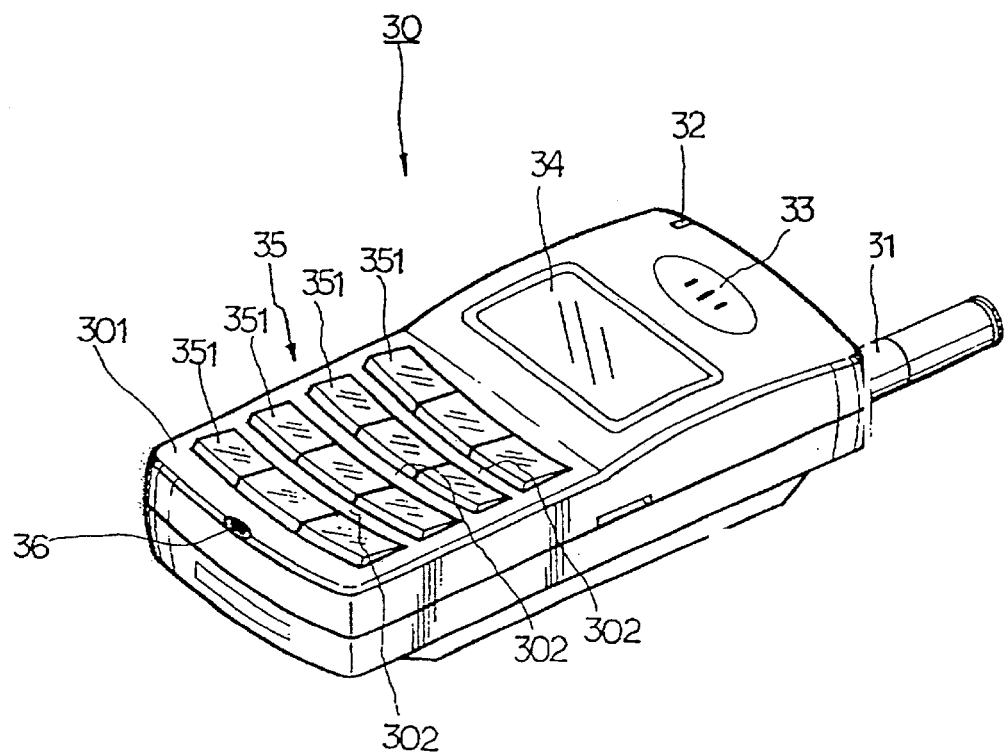
FIG. 10 is a perspective view of a terminal having a step key assembly according to a third embodiment of the present invention.

FIG. 10 is a perspective view of a terminal to which a step key assembly 35 according to a third embodiment of the present invention is applied. Referring to FIG. 10, the terminal includes a main body 30, an antenna device 31 at an uppermost end of the main body 30, an earpiece 33 under the antenna device 31, a display 34 under the earpiece 33, for displaying input data, the step key assembly 35 to be pressed when data is entered, and a microphone 36 under the step key assembly 35. Only the top side of the step key assembly 35 is exposed from the upper surface 301 of the main body 30. Here, individual step keys 351 contact with each other in a transverse direction and are separated from each other in a longitudinal direction. That is, the step keys 351 are arranged in rows and columns and the rows are spaced from each other by a predetermined distance. Main body support frames 302 are located in the spaces S between the rows. The support frames 302 are extended in the transverse direction.

Figure 11:
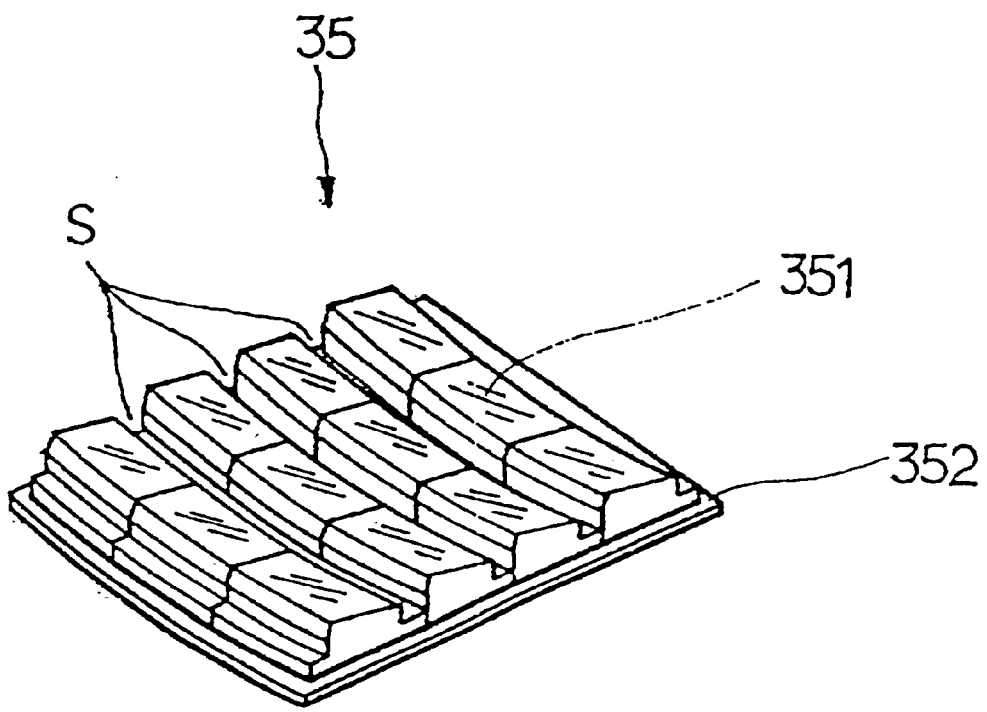
FIG. 11 is a perspective view of the step key assembly according to the third embodiment of the present invention.

FIG. 11 is a perspective view of the step key assembly 35 according to the third embodiment of the present invention. The step key assembly 35 includes a plurality of step keys 351 and a film 352 on which the step keys 351 are fixed. The step keys 351 are fixed on the film 352 in such a way that they contact each other in the transverse direction and are spaced by the distance S in the longitudinal direction. The step keys 351 are arranged in the transverse direction in the order of first to fourth rows. After the step key assembly 35 is fixedly mounted to the terminal, only the top ends of the step keys 351 are exposed from the main body 30. As stated before, the top end of an individual step key 351 is divided into a first slope portion and a second slope portion connected to the first slope portion. The step keys 351 are fixed on the film 352 as in the procedure shown in FIG. 5, which will not be described again.

Figure 12:
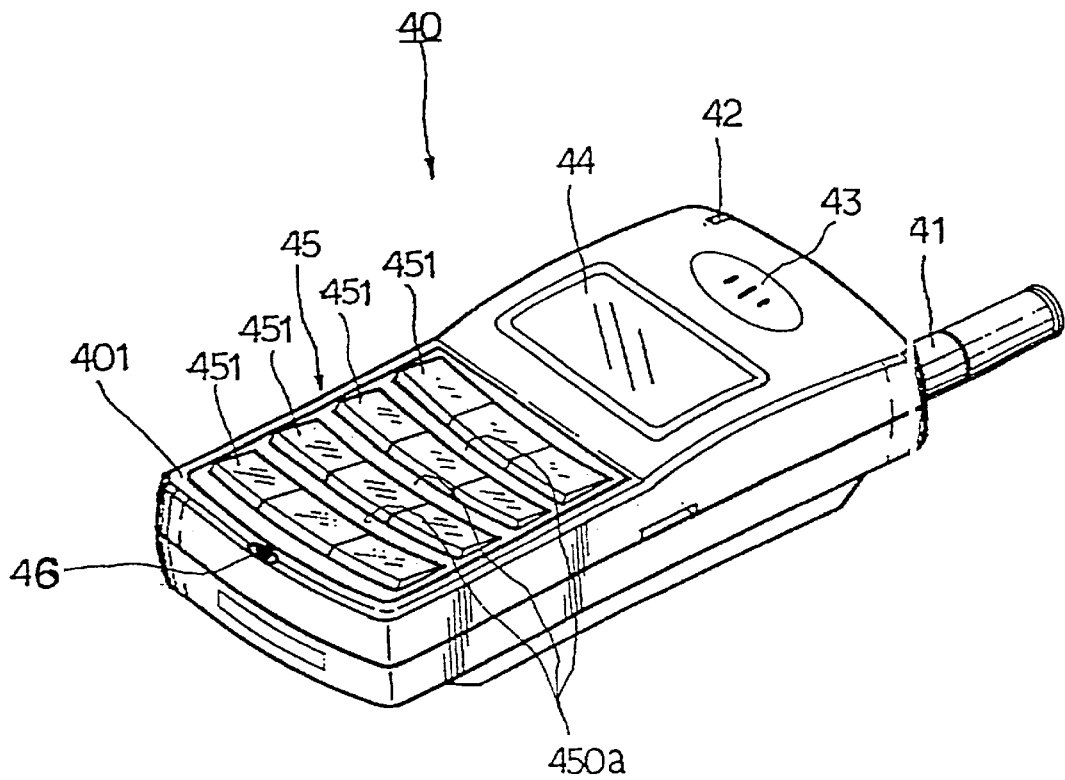
FIG. 12 is a perspective view of a terminal having a step key assembly according to a fourth embodiment of the present invention.
Figure 13:
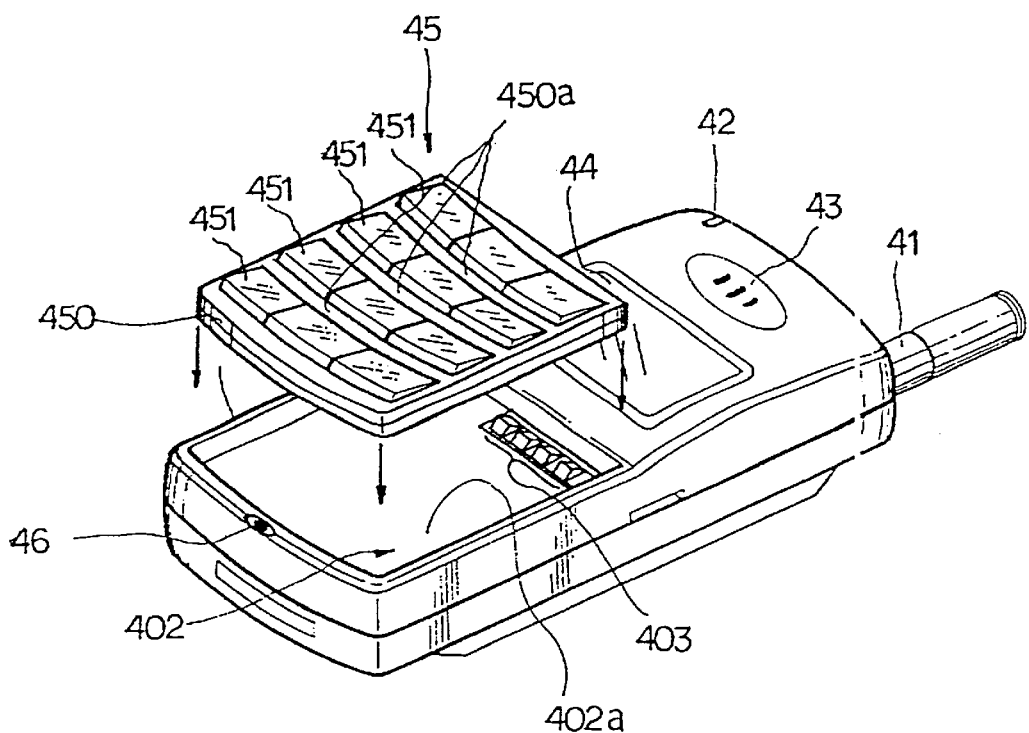
FIG. 13 is a perspective view of the terminal and the step key assembly that are separated from each other according to the fourth embodiment of the present invention.

FIG. 12 is a perspective view of a terminal to which a step key assembly 45 according to a fourth embodiment of the present invention is applied and FIG. 13 is a perspective view of the terminal and the step key assembly 45 that are separated from each other. Referring to FIGS. 12 and 13, the terminal is comprised of a main body 40 having a recess 402 at a predetermined position, an antenna device 41 at an upper end of the main body 40, an earpiece 43 under the antenna device 41, a display 44 under the earpiece 43, the independent step key assembly 45 assembled in the recess 402 under the display 44, a double-sided tape (not shown) identical to that shown in FIG. 9, for fixing the step key assembly 45 in the recess 402, a connection portion including first and second terminals (only the first terminals are shown in FIG. 13 and the second terminals are identical to those shown in FIG. 9), for electrically connecting the step key assembly 45 to the main body 40, and a microphone 46 under the step key assembly 45. The step key assembly 45 is placed down and fixed in the recess 402. Here, the double-sided tape is attached to the bottom surface of the step key assembly 45 as shown in FIG. 9, in order to fix the step key assembly 45 on the bottom surface 402a of the recess 402. The first terminals 403 are disposed at a predetermined position on the recess bottom surface 402a and the second terminals are disposed at the same position as shown in FIG. 9. When the step key assembly 45 is attached in the recess 402, the first terminals 403 and second terminals are connected. As a result, the step key assembly 45 is electrically connected to a PCB (not shown) of the main body 40. Reference numeral 42 denotes an incoming call lamp.

While it is shown that the step key assembly 45 includes a casing frame 450 and step keys 451 the top ends of which are exposed in the casing frame 450, it is to be noted that the step key assembly 45 further includes a film (not shown) identical to that shown in FIG. 4. Though not shown, the film, metal domes, and the PCB or flexible printed circuit are disposed under the step keys 451. The second terminals are connected to the PCB or the flexible printed circuit.

The step key assembly 45 is so installed that only the top ends of the step keys 451 are exposed from the casing frame 450 and the step keys 451 contact each other in a transverse direction, being spaced from each other in a longitudinal direction. The casing frame 450 has a plurality of support frames 450a. The support frames 450a are extended in the transverse direction, being spaced from each other in a longitudinal direction.

The location of the first terminals 403 is not limited to a corner of the recess bottom surface 402a. For example, the first terminals 403 may be located at the center or a sidewall of the recess 402. The location of the second terminals is not limited to a corner under the step key assembly 45, either. The second terminals may also be located at the center or on a side under the step key assembly 45.

Additionally, a different means for electrically connecting the step key assembly 45 to the main body 40 can be used instead of the first terminals 403 and second terminals. For example, the first terminals 403 and second terminals can be replaced with a pair of female/male connectors, particularly a pair of female/male connectors using a flat-type cable, in consideration of assembly facility.

Figure 14:
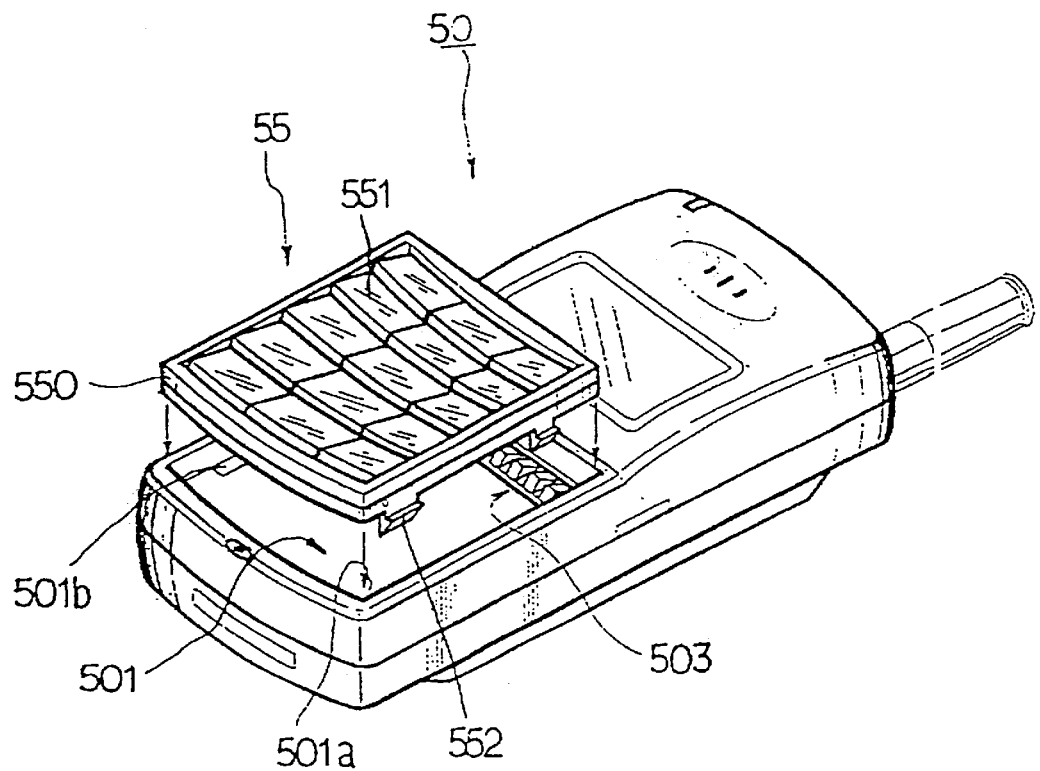
FIG. 14 is a perspective view of a step key assembly separated from a terminal according a fifth embodiment of the present invention.

FIG. 14 is a perspective view of a terminal to which a step key assembly 55 according to a fifth embodiment of the present invention is applied. Referring to FIG. 14, steps keys 551 are arranged in the same manner as shown in FIG. 2. The step key assembly 55 is fixed in a recess 501 of a main body 50 via hooks 552 and holes 501b. The hooks 552 are extended downward from predetermined positions of the step key assembly 55 and the holes 501b are formed at predetermined positions of a recess bottom surface 501a corresponding to the positions of the hooks 552. Insertion of the hooks 552 into the holes 501b maintains the step key assembly 55 fixed in the recess 501. Here, it is preferable to form the hooks 552 symmetrically. A means for electrically connecting the step key assembly 55 to the main body 50 has been described before in detail. First terminals 503 are disposed at a predetermined position of the recess 501 and second terminals (not shown) are provided on the bottom surface of the step key assembly 55.

Figure 15:
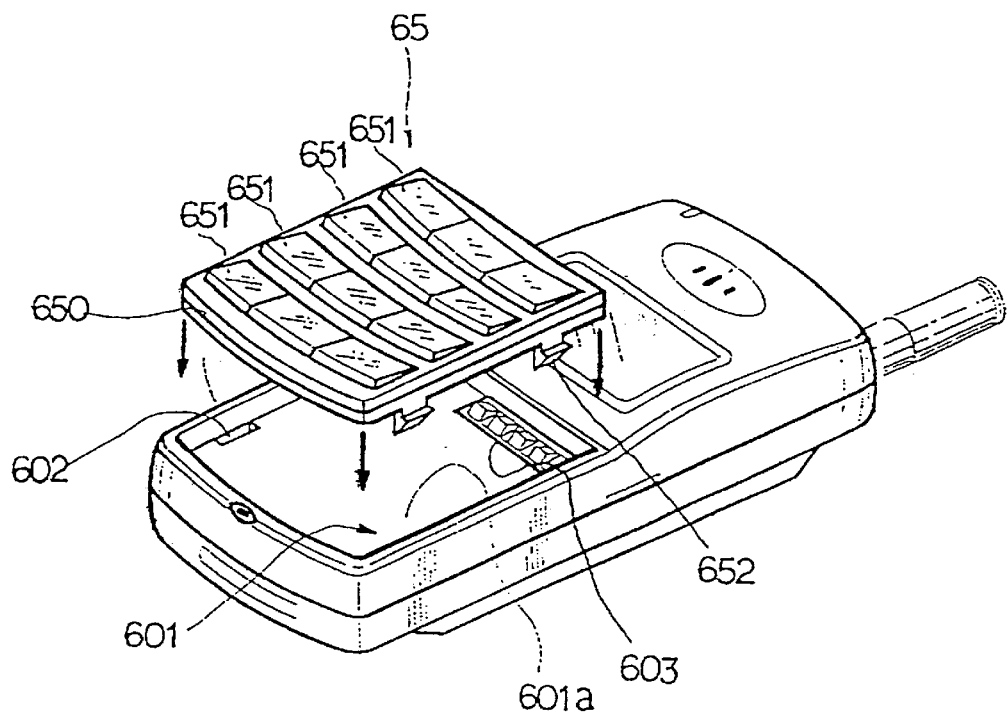
FIG. 15 is a perspective view of a step key assembly separated from a terminal according a sixth embodiment of the present invention.

FIG. 15 is a perspective view of a terminal and a step key assembly 65 according to a sixth embodiment of the present invention that is removed from the terminal. Referring to FIG. 15, step keys 651 are arranged in the same manner as shown in FIG. 10. The step key assembly 65 is fixed in a main body recess 601 via hooks 652 and holes 602. The hooks 652 are extended downward from predetermined positions of the step key assembly 65 and the holes 602 are formed at predetermined positions of the bottom surface 601a of the recess 601 corresponding to the positions of the hooks 652. Insertion of the hooks 652 into the holes 602 maintains the step key assembly 65 fixed in the recess 601. It is preferable to form the hooks 652 symmetrically. A means for electrically connecting the step key assembly 65 to a main body 60 has been stated before. First terminals 603 are disposed in the recess 601 and second terminals (not shown) are provided on the bottom surface of the step key assembly.

Figure 16:
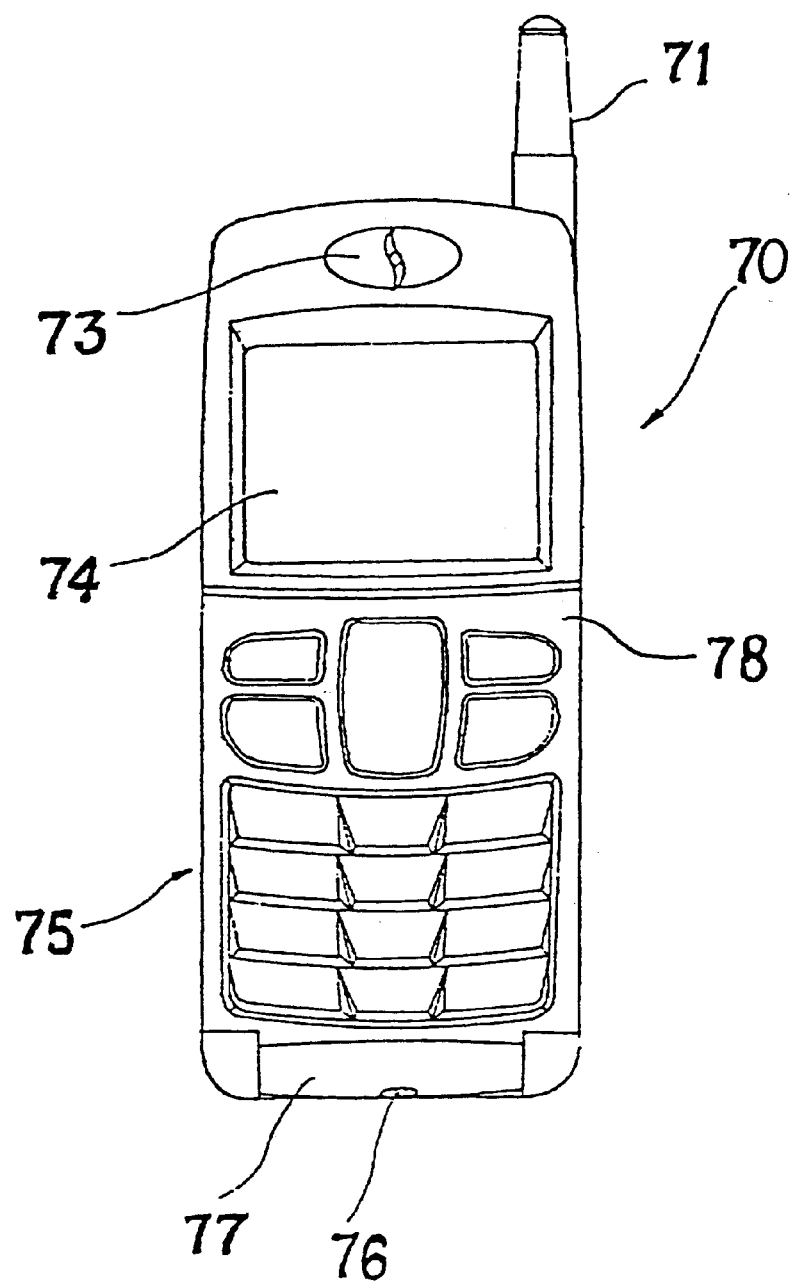
FIG. 16 is a plan view of a terminal having a step key assembly according to a seventh embodiment of the present invention.

FIG. 16 is a plan view of a terminal to which a step key assembly according to a seventh embodiment of the present invention is applied. Referring to FIG. 16, the terminal has a main body 70 with an upper casing frame 78 and a lower casing frame (not shown), a sub-body (not shown) installed to be opened/closed according to user choice, and a hinge arm 77 by which the sub-body can be placed to an open/closed position with respect to the main body 70. Though not shown, the sub-body can be a flip cover or a folder that protects the keypad assembly and is rotatable at a predetermined communication angle.

An antenna device 71 is installed at an uppermost end of the main body 70. An earpiece 73 and an LCD module 74 are sequentially disposed under the antenna device 71. The keypad assembly 75 and a microphone 76 are sequentially arranged on the main body 70.

Since the keypad assembly 75 is integrally formed, the corners of the keypad assembly are fixed to the inner side surfaces of the frame 78 without forming holes on the frame 78 for protrusion of a plurality of key buttons.

Figure 17:
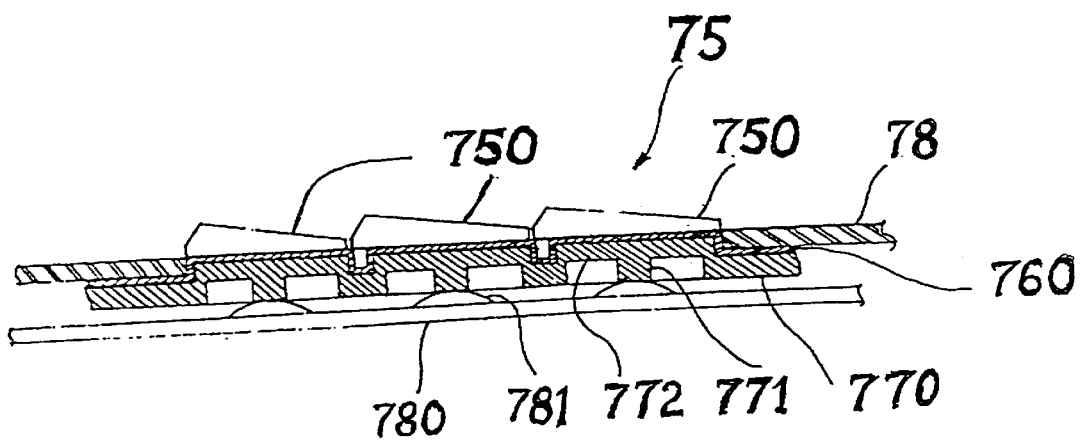
FIG. 17 is a partial sectional view of the step key assembly shown in FIG. 16.

FIG. 17 is a partial sectional view of the terminal shown in FIG. 16 according to the seventh embodiment of the present invention. Referring to FIG. 17, a silicon keypad rubber 770 is installed on the upper casing frame 78. A plurality of button portions 772 spaced from each other by a predetermined distance are integrated with contact point protrusions 771 extended downward from the button portions 772 in the keypad rubber 770. A film sheet 760 of the same pattern is attached onto the upper surface of the keypad rubber 770 in order to protect the keypad rubber 770 against damage.

Hard key buttons 750 are individually attached on the button portions 772 covered with the film sheet 760 so that the distance between the key buttons 750 is very narrow. The key buttons 750 are formed of plastic. The key buttons 750 can be attached onto the upper surface of the film sheet 760 by a predetermined adhesive means.

The upper surface of each key button 750 is divided into a first slope portion and a second slope portion larger that the first slope portion in the opposite direction to the first slope portion. Thus, the key buttons 750 are arranged stepwise to facilitate reliable key button pressing.

A PCB 780 of a predetermined pattern is installed on the main body 70. The PCB 780 has metal domes 781 at positions corresponding to the contact point protrusions 771, so that the contact point protrusions, 771 contact the carbon contact points of the PCB 780 via the metal domes 781.

Figure 18:
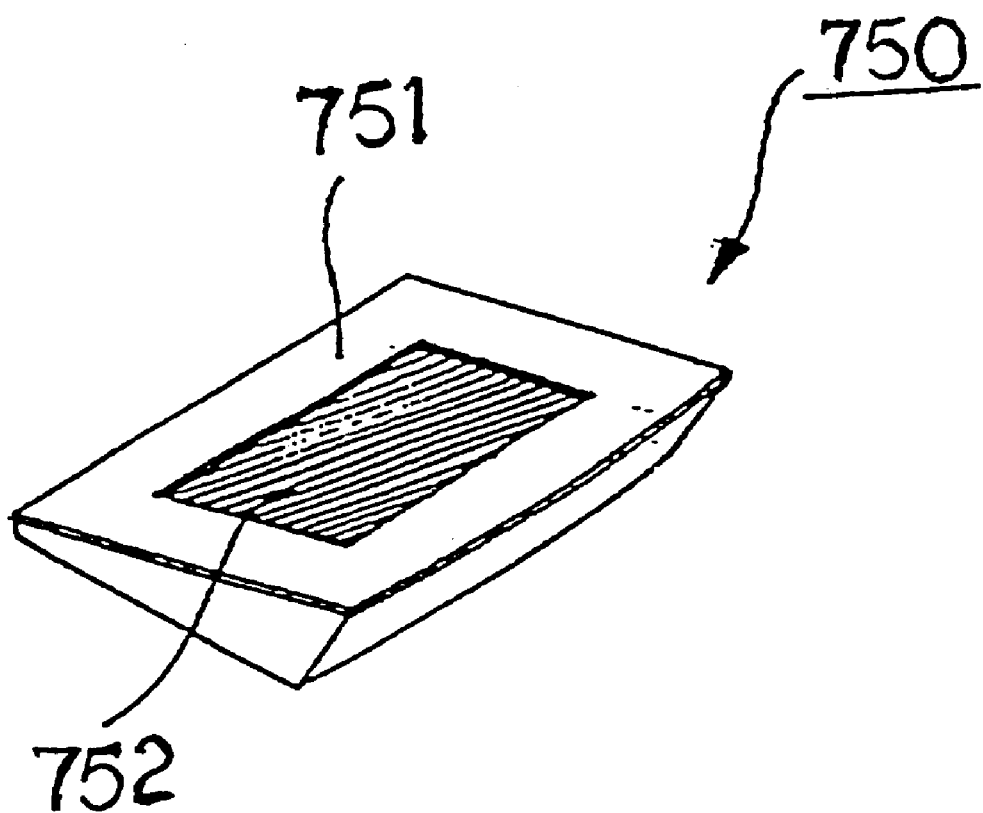
FIG. 18 is a perspective view of the surface of a key button to which an adhesive is applied according to the seventh embodiment of the present invention.
Figure 19:
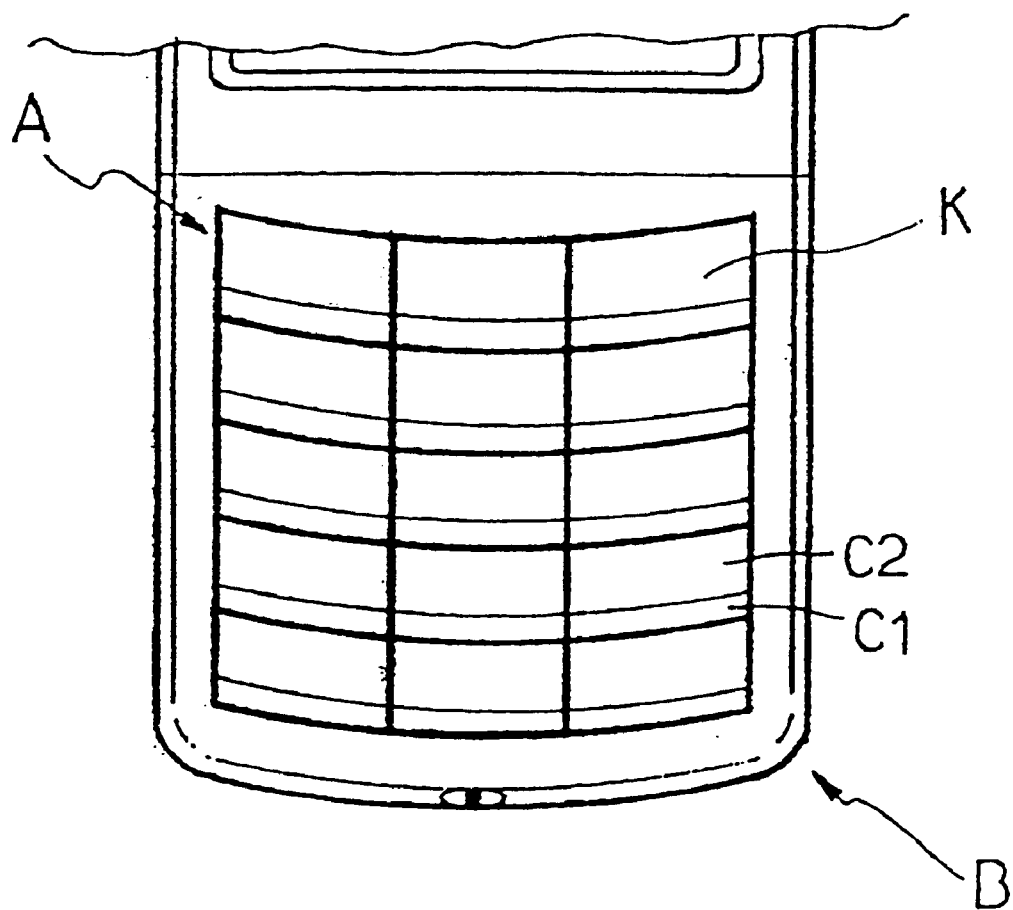
FIGS. 19 to 27 are partial plan views of terminals having different arrangements of individual step keys according to the present invention.
Figure 20:
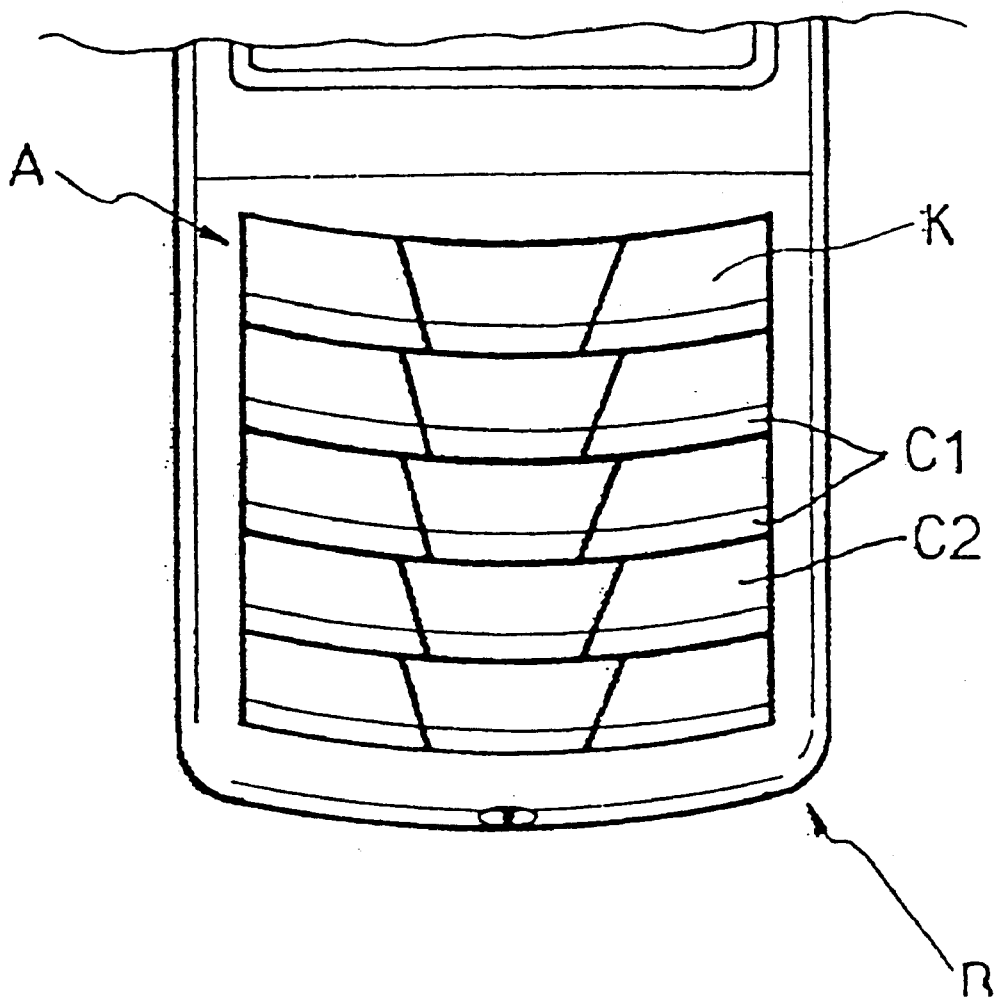
Figure 21:
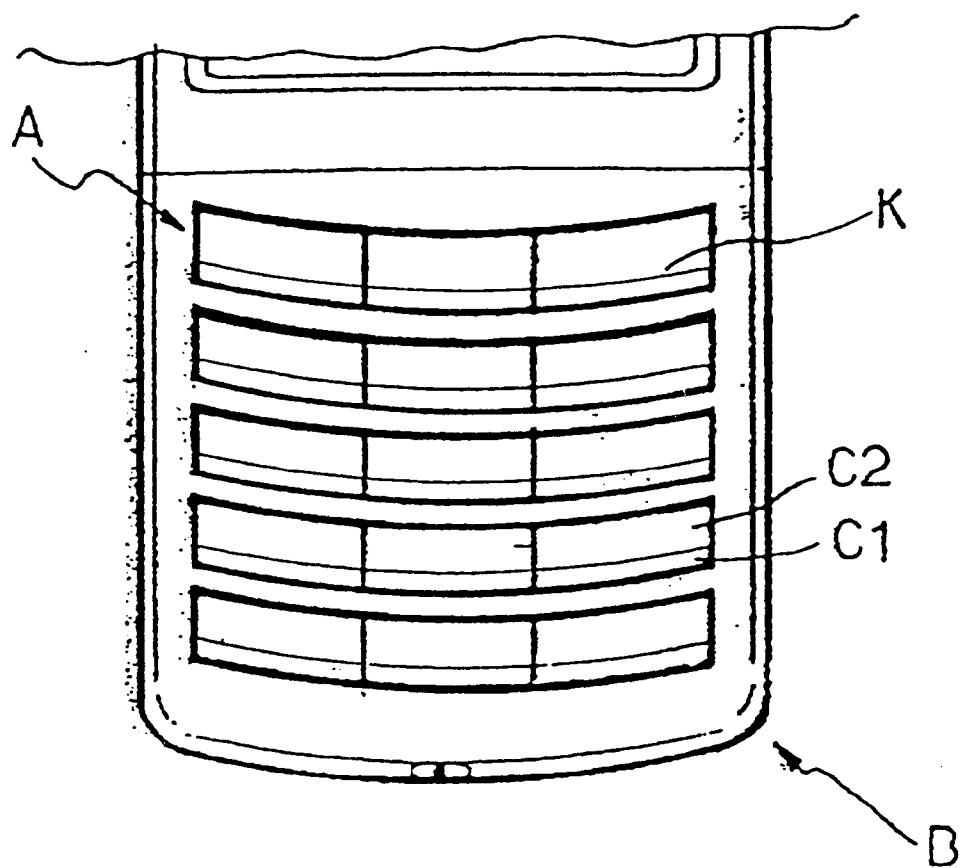
Figure 22:
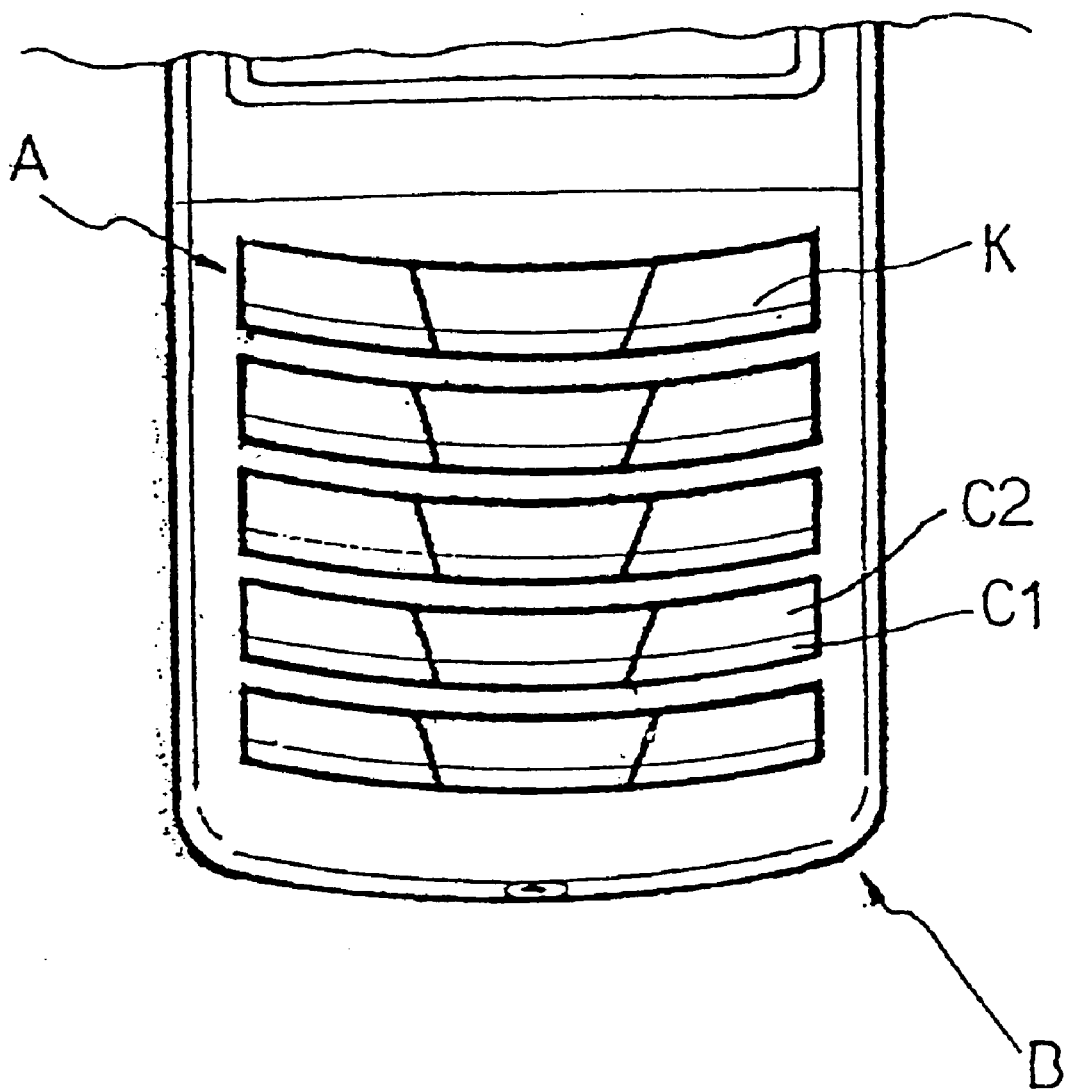
Figure 23:
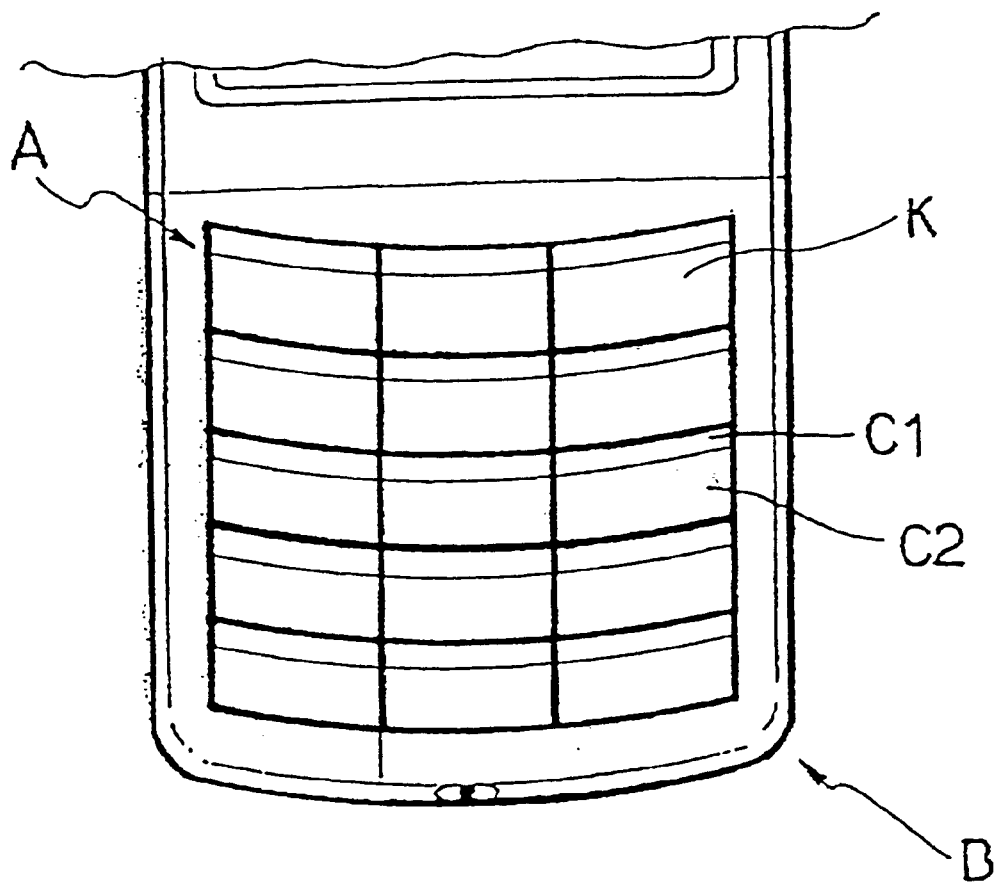
Figure 24:
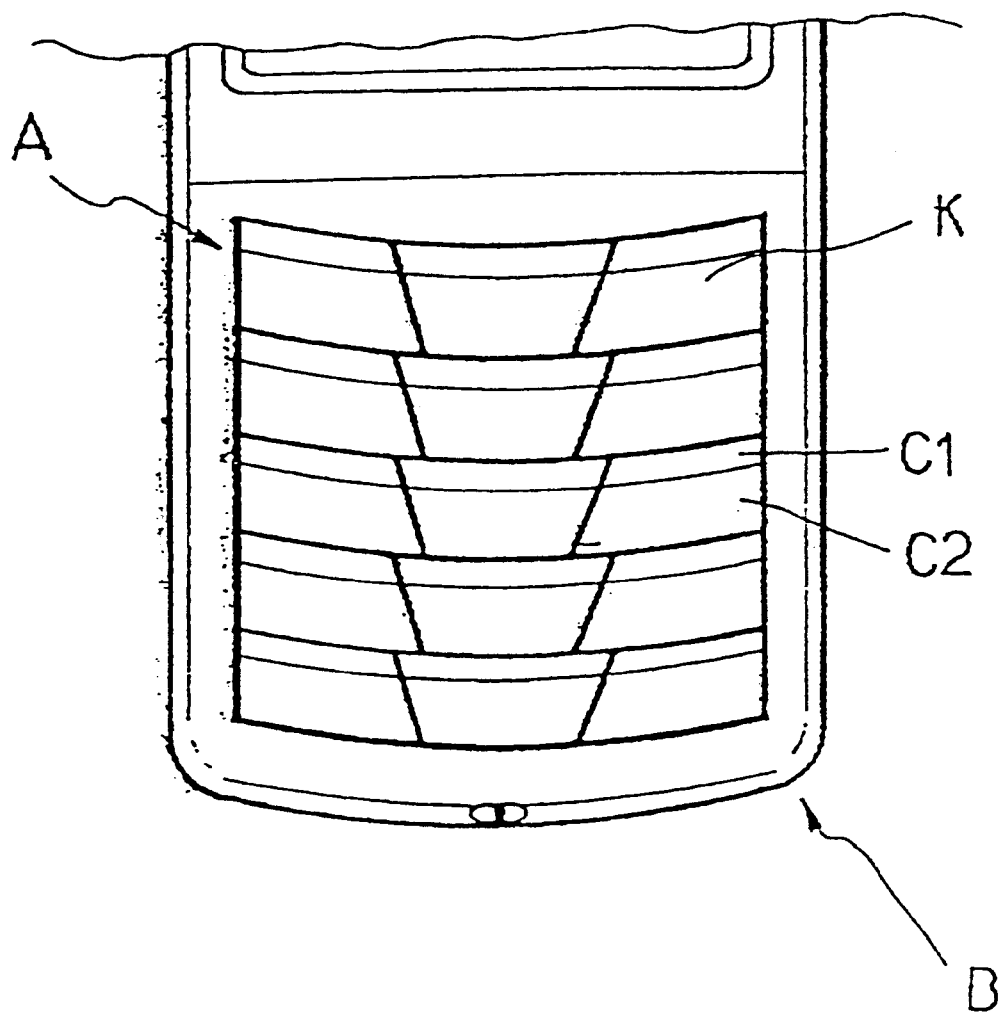
Figure 25:
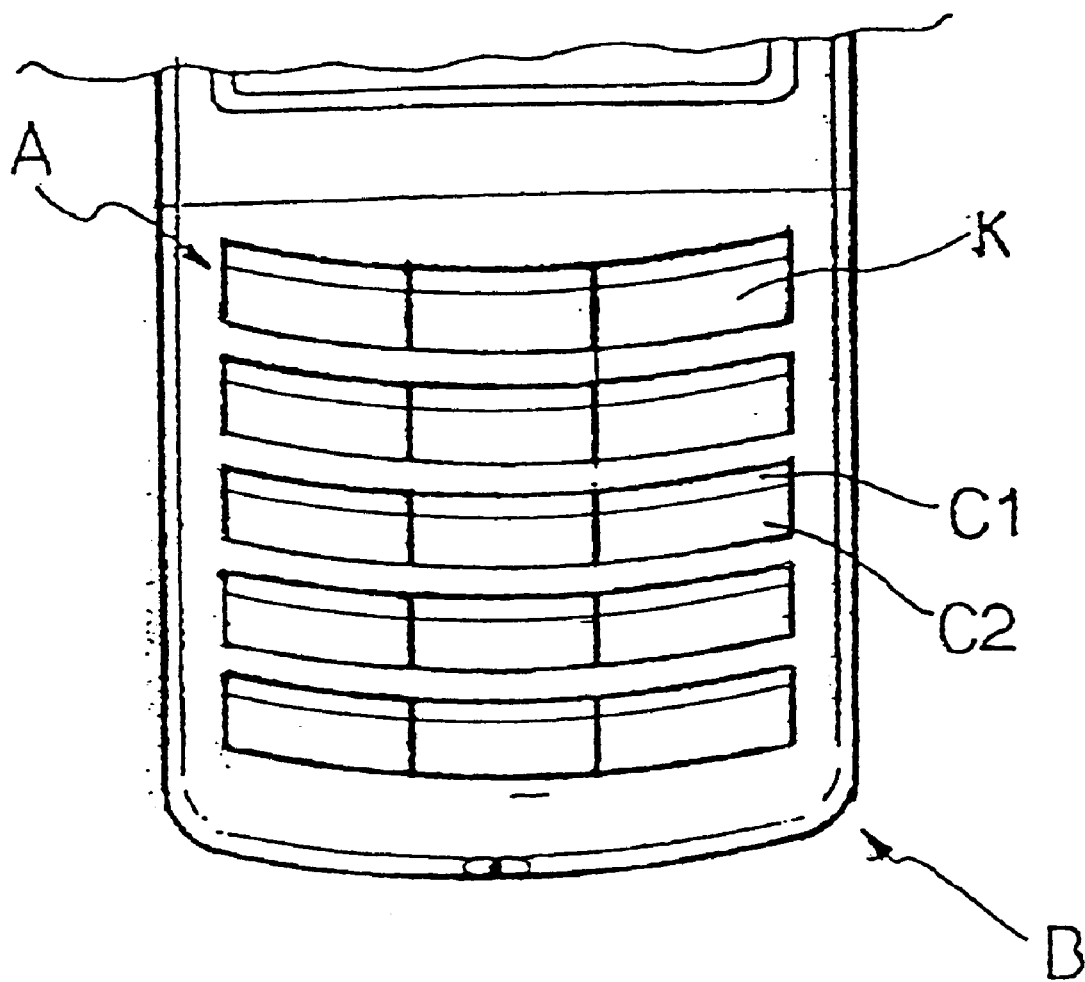
Figure 26:
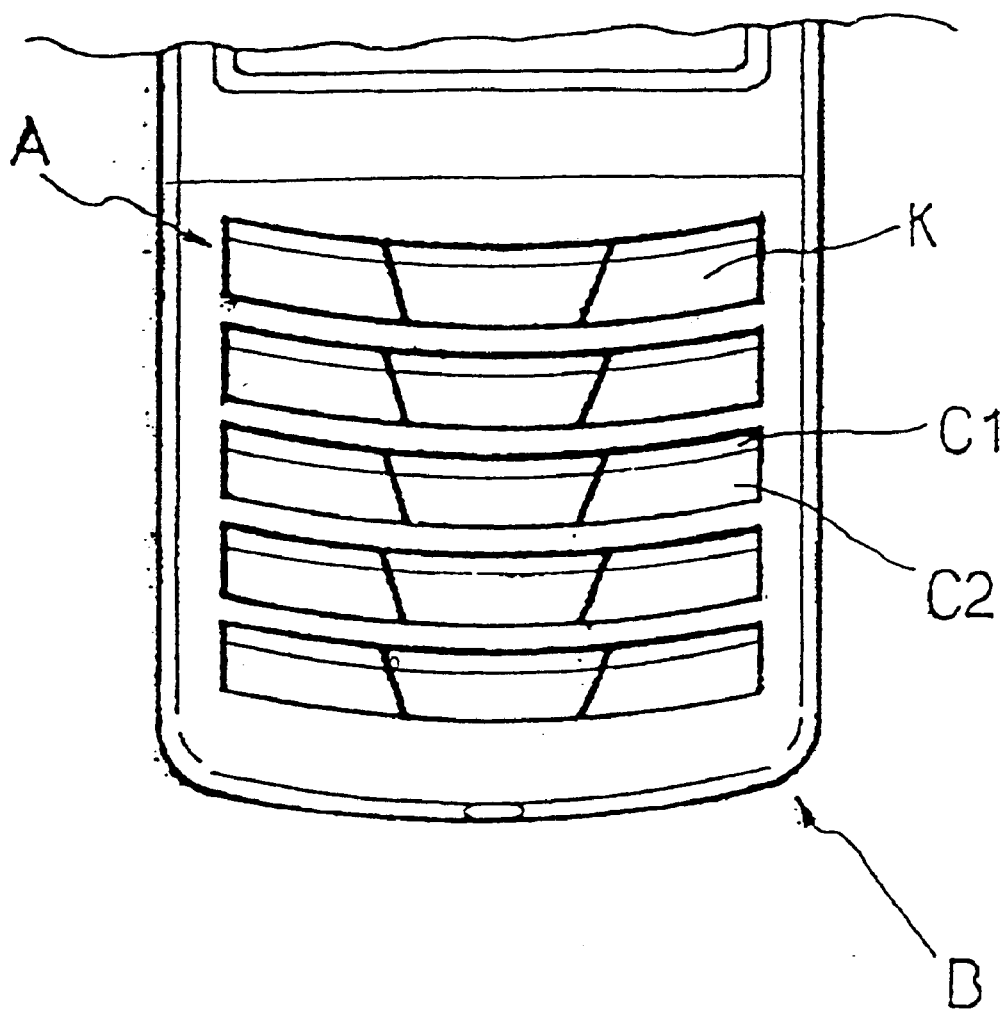

FIG. 18 is a perspective view of the surface of an individual key button 750 to which an adhesive is applied according to the seventh embodiment of the present invention. An adhesive tape 751 and an adhesive 752 are applied to the lower surface of the key button 750 that contact the film sheet 760. As shown in FIG. 18, the double-sided adhesive tape 751 is attached along the periphery of the lower surface of the key button 750. An opening is formed at the center of the double-sided adhesive tape 751 and the adhesive 752 is coated on the opening. Therefore, the key button 750 is firmly attached to the film sheet 760. Only one of the double-sided tape 751 and the adhesive 752 can be used as an adhesive means.

FIGS. 19 to 22 are partial plan views illustrating portions of terminals having step key assemblies A according to the present invention. As shown in FIGS. 19 to 22, various modifications of step keys K can be exist and arranged in the step key assemblies A in diverse manners according to the present invention. Particularly, first and second slope portions C1 and C2 can be designed in various shapes on the top ends of the individual steps keys K, exposed from the upper surface of main bodies. Furthermore, the first slope portions C1 may be lower than the second slope portions C2.

FIGS. 23 to 26 are plan views illustrating portions of other terminals having step key assemblies A according to the present invention. As shown in FIGS. 23 to 26, various modifications of step keys K can be exist and arranged in the step key assemblies A in diverse manners according to the present invention. Particularly, first and second slope portions C1 and C2 can be designed in various shapes on the top ends of the individual steps keys K, exposed from the upper surface of main bodies. Furthermore, the first slope portions C1 may be higher than the second slope portions C2.

Figure 27:
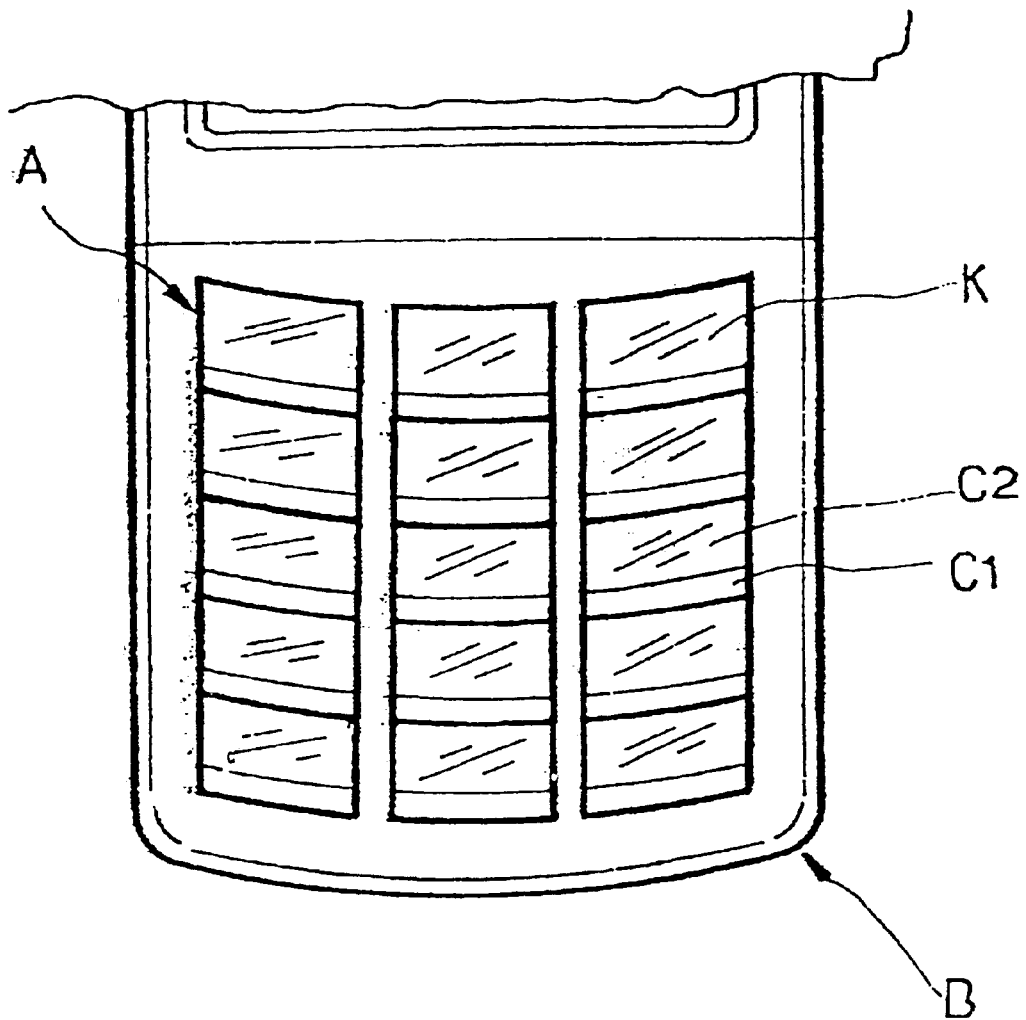

FIG. 27 is a plan view illustrating a ninth terminal having a step key assembly A according to the present invention. Referring to FIG. 27, support frames are arranged on the upper side of a main body B. The support frames are separated from each other in a transverse direction. The step keys K are so arranged that they contact each other in a longitudinal direction and are separated in a transverse direction in the step key assembly A applied to the main body B.

In accordance with the present invention as described above, use of individual keys and a step key assembly with the step keys fixed on a film as a data input device offers the benefits of easy key pressing to users, and the benefits of miniaturization of a main body of a terminal, maximization of key size, and assembly facility to manufacturers. In addition, since key buttons are individually attached on the upper surface of a film sheet in a keypad assembly of a portable radio terminal according to the present invention, pressing of a particular key has no influence on its adjacent keys. That is errors can be prevented in pressing keys. A user can enter data conveniently because the present invention enables a small main body and large keys to be achieved. Furthermore, terminals according to the present invention can be readily assembled.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A keypad assembly in a portable radio terminal, comprising:
   a rubber keypad having a plurality of contact point protrusions for pressing down a plurality of metal domes on a printable circuit board (PCB) of a main body of the portable radio terminal, and a button portion integrally formed on each contact point protrusion;
   a thin film sheet attached on an upper surface of the rubber keypad; and
   a plurality of hard key buttons individually fixed on the button portions, wherein the hard key buttons are fixed on the thin film sheet by an adhesive means which includes a double-sided adhesive tape having an opening at a center thereof and being attached along a periphery of a lower surface of the key button, and an adhesive to be coated on the opening of the double-sided adhesive tape.

2. The keypad assembly of claim 1, wherein each key button is formed of plastic.

3. A keypad assembly in a portable radio terminal, comprising:
   a rubber keypad having a plurality of contact point protrusions for pressing down a plurality of metal domes on a printable circuit board (PCB) of a main body of the portable radio terminal, and a button portion integrally formed on each contact point protrusion;
   a thin film sheet attached on an upper surface of the rubber keypad; and
   a plurality of key buttons individually fixed on the button portions, wherein each key button is shaped into a step having a first slope portion and a second slope portion larger in area than the first slope portion and inclined in an opposite direction.

* * * * *